United States Patent

Glossop, Jr. et al.

[11] Patent Number: 5,106,149
[45] Date of Patent: Apr. 21, 1992

[54] WEATHERSTRIP FOR HARDTOP-TYPE OR FRAMED DOOR WINDOWS

[75] Inventors: Donald L. Glossop, Jr., Dearborn Heights; Charles J. Haddad, Bloomfield Hills, both of Mich.

[73] Assignee: Ford Motor Company, Dearborn, Mich.

[21] Appl. No.: 457,035

[22] Filed: Dec. 26, 1989

[51] Int. Cl.$^5$ .............................. B60J 10/08
[52] U.S. Cl. .................. 296/213; 296/146; 296/214; 49/476
[58] Field of Search ............ 296/146, 154, 213, 214; 49/476

[56] References Cited

U.S. PATENT DOCUMENTS

| | | | |
|---|---|---|---|
| 4,378,130 | 3/1983 | Shimizu | 296/146 X |
| 4,490,942 | 1/1985 | Arnheim et al. | 49/374 |
| 4,575,147 | 3/1986 | Ui et al. | 296/154 |
| 4,584,793 | 4/1986 | Okada et al. | 49/488 |
| 4,603,899 | 8/1986 | Iwasa | 296/154 |
| 4,678,227 | 7/1987 | Castagno | 296/213 |
| 4,729,593 | 3/1988 | Nisiguchi et al. | 296/154 |
| 4,769,950 | 9/1988 | Ogawa | 49/490 |
| 4,807,923 | 2/1989 | Nakamura | 296/146 |
| 4,919,471 | 4/1990 | Seino et al. | 296/154 |

FOREIGN PATENT DOCUMENTS

| | | | |
|---|---|---|---|
| 146186 | 6/1985 | European Pat. Off. | 296/146 |
| 164601 | 12/1985 | European Pat. Off. | 296/146 |
| 182318 | 5/1986 | European Pat. Off. | 296/146 |
| 3126491 | 1/1983 | Fed. Rep. of Germany | 296/146 |
| 3236751 | 4/1984 | Fed. Rep. of Germany | 296/146 |
| 64023 | 4/1985 | Japan | 296/146 |
| 104435 | 6/1985 | Japan | 296/146 |
| 208222 | 8/1989 | Japan | 296/146 |

Primary Examiner—Margaret A. Focarino
Assistant Examiner—Andrew C. Pike
Attorney, Agent, or Firm—Daniel M. Stock; Roger L. May

[57] ABSTRACT

A door glass weatherstripping for a motor vehicle comprises a main body; a gap-filling seal for filling the space between the edge of the surrounding surfaces and the edges of the window; a window positioning portion having a hardness greater than at least the gap-filling seal portion for guiding the window in its uppermost position thereby assuring lateral location of the window; and a gutter forming lip positioned so that substantially all the water dripping off the portion of the roof or surrounding surfaces where the weatherstrip is attached is prevented from entering the interior of the vehicle. The weatherstrip section on hardtop-type window systems may be positioned such that it extends around the whole door opening.

8 Claims, 2 Drawing Sheets

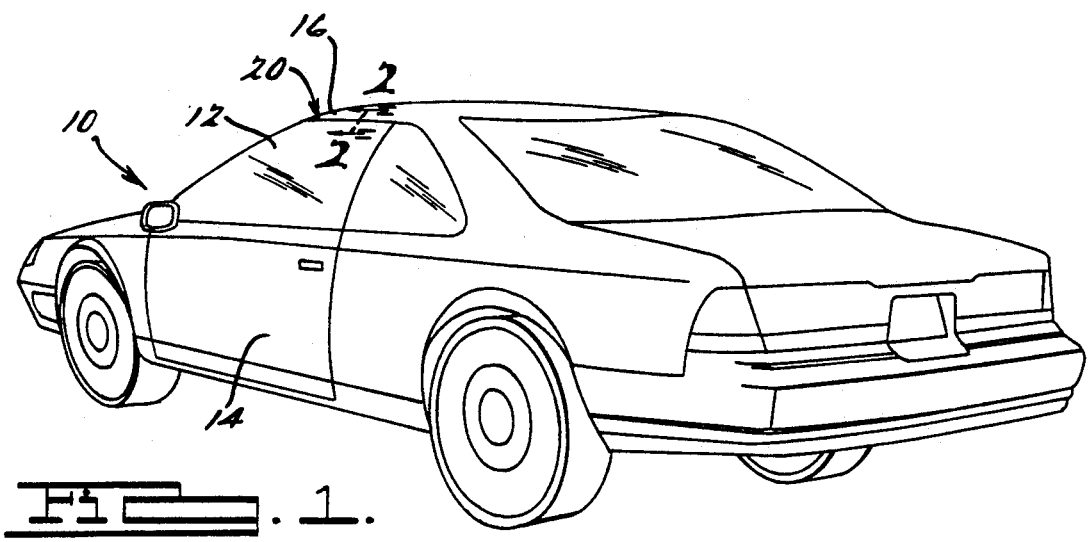
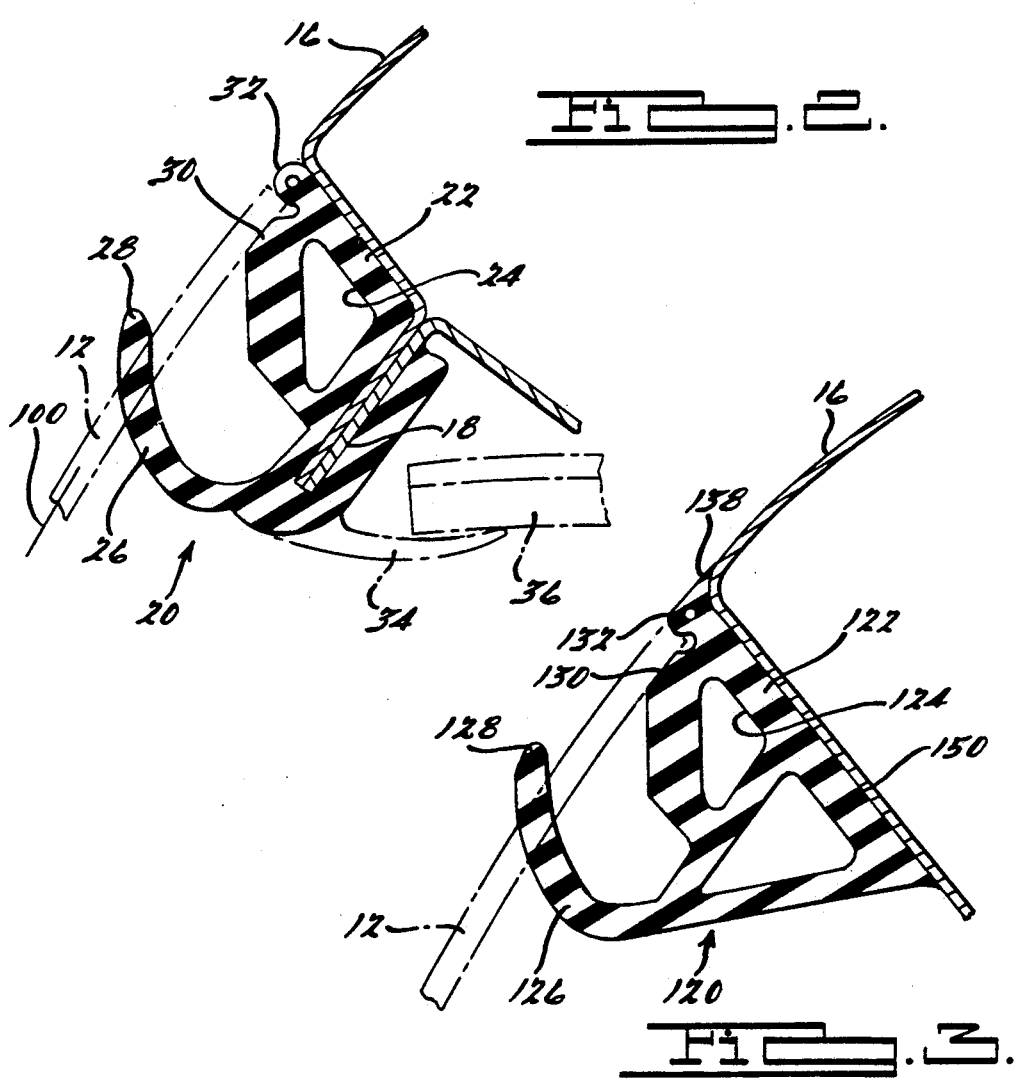

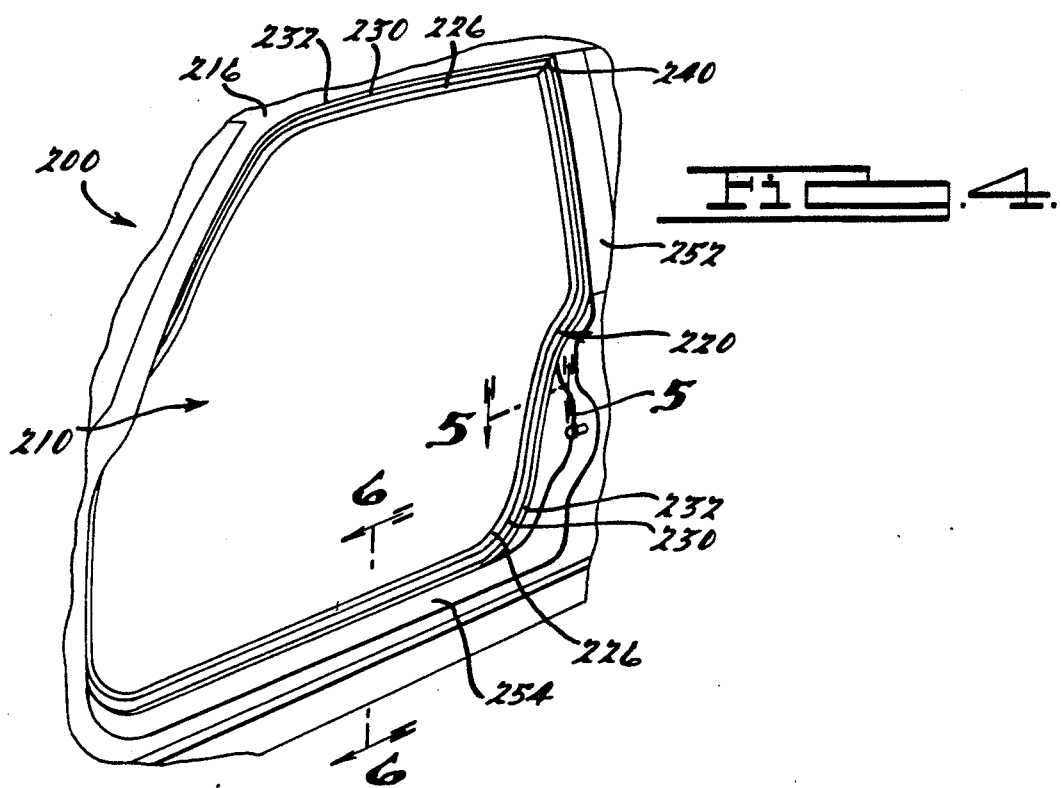
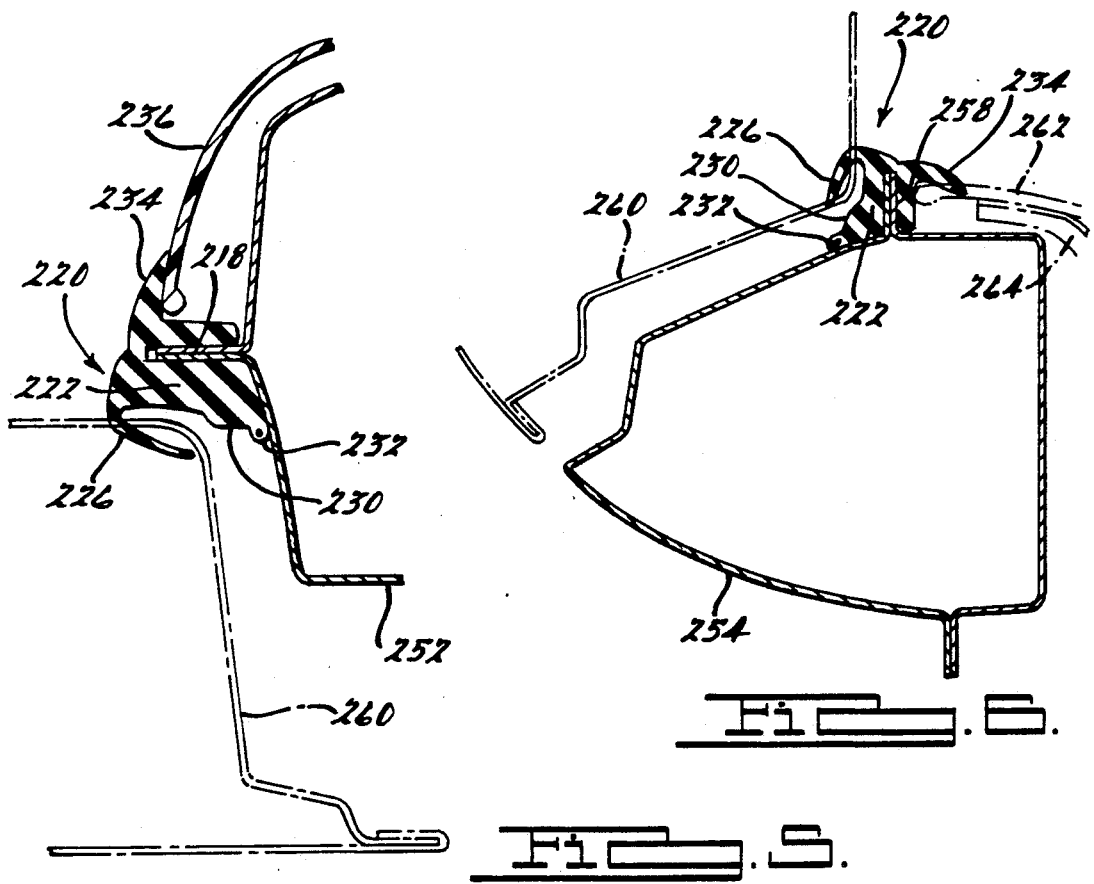

WEATHERSTRIP FOR HARDTOP-TYPE OR FRAMED DOOR WINDOWS

BACKGROUND OF THE INVENTION

1. Field of the Invention

The present invention relates to a weatherstrip for a motor vehicle and specifically to a weatherstrip either for hardtop-type windows sealing against roof pillars or other surrounding structure or for framed door windows where the seal to the window is mounted in the door frame. This weatherstrip could also be used in trailers, homes or other structures, or devices which contain moving windows where there is a desire for flush appearance at the edges of the windows.

2. Discussion of the Related Art

Many motor vehicle openings include a door containing a window opening which is completely surrounded by the door frame. These vehicle openings usually require two separate weatherstrippings to be utilized to prevent water, air, and other materials from entering the vehicle. The first weatherstrip is between the door frame and the vehicle body and another weatherstrip is between the door glass and the door frame.

The door frame windows discussed above are quite different from flush hardtop-type windows and thus their seals are quite different also. Hardtop-type windows as used herein are windows which do not have a door frame completely around the periphery of the window when the window is closed. These windows are designed such that there is no door frame between the upper section of the window and the edge of the roof of the vehicle. Usually one weatherstrip is utilized to accomplish the sealing function.

As aerodynamics and wind noise have become more important in automobile design there has been an interest in decreasing the offset between the automobile window's exterior surface and the surrounding area of either the door frame exterior surface for frame doors or the surrounding body surfaces (roof, pillars, and/or other adjacent windows) for hardtop-type windows. In addition to offsets between windows and surrounding body or door surfaces most vehicles have had some form of a water catching gutter or "drip" either shaped into the body structure pieces or added trim pieces and these are sometimes referred to as "drip" moldings.

Weatherstripping for sealing between the door glass and the edge of the roof of the vehicle is known in the art. However most of them have utilized a shingled geometry where falling water is assisted to fall only on the exterior surface of the window. Even the most nearly flush weatherstripping usually has some portion of the weatherstrip lapping over the edges of the window and therefore it is not perfectly flush. However, no weatherstrip provides a gap-filling bulb which does not lap to touch the outside surface of the window but causes the water to shed only because it touches the edge of the window and fills the gap but does not protrude beyond the outer surface of the window. Furthermore, none of the known weatherstrips include: 1) a gutter forming lip which acts as a gutter to catch water running off the roof when either the door or the window is open or 2) a window positioning portion which includes relatively hard portions for assuring the location of the window in its uppermost position.

Arnheim et al.(U.S. Pat. No. 4,490,942) discloses a weatherstripping which is disposed on a window frame and includes an upper seal for sealing between the window panel and the edge of the roof and a seal which seals the back of the window. However this seal cannot constitute a gutter forming lip because it does not extend past the vertical plane of the edge of the roof when the lip is in the extended position. Also there is no showing of a window positioning portion of the weatherstrip.

Okada et al.(U.S. Pat. No. 4,584,793) discloses a weatherstrip for the door glass of a motor vehicle. This reference clearly shows a seal between the door frame and the door glass and also a seal along the inner surface of the door glass. However this type of weatherstrip application is not concerned with sealing a substantially flush window.

Shimizu (U.S. Pat. No. 4,378,130) discloses another weatherstrip for a vehicle containing a door frame completely around the periphery of the window opening. Shimizu shows a roof slide rail assembly which has a drip channel that is formed therein and continuously extends from the front of the door opening to a rear portion of the rear side window. In this patent, a third weatherstrip is disclosed between the door glass and the door frame. This weatherstrip does not show or suggest a gutter forming lip portion nor a window positioning portion.

SUMMARY OF THE INVENTION

The mentioned disadvantages of the prior art weatherstripping devices are overcome in the present invention by providing a door glass weatherstripping for a motor vehicle that is constructed in a fashion suitable for sealing engagement with windows that are substantially flush with an edge of the roof of the vehicle or other surrounding portions of the vehicle. The weatherstripping of the present invention includes a main body portion attachable to a portion of the vehicle body and a window positioning portion that is operative to guide the window in its uppermost position to assure lateral location of the window. The improved weatherstrip of the present invention may also include a gutter forming lip portion engageable by the window for sealing, but being flexible to form a gutter when not sealingly engaged to prevent entry of water from the vehicle body to the interior of the vehicle. The invention weatherstrip may also include a gap filling sealing portion sealingly engageable in a space between an edge of the vehicle and an upper edge of the window when it is in its uppermost position to effect positive sealing engagement therebetween.

It is an object of the present invention to provide a weatherstrip which allows the door glass to be substantially perfectly flush with the roof, pillars, and other portions of the motor vehicle for hardtop-type windows and to be substantially perfectly flush with the surrounding door frame exterior surface for framed window systems.

It is a further object of the present invention to provide a weatherstrip which catches the water which may run off the roof and tend to fall into the vehicle.

It is a further object of the present invention to provide a weatherstrip which through certain more rigid areas of the weatherstrip assures the location of the window surface even to the extent that it may cause the window to deflect so that the perfectly flush condition is achieved.

It is yet a further object of the present invention to provide a weatherstrip which will allow a reduced door closing effort. This object is primarily achieved by the use of a single lip on the seal as the major sealing element. This type of lip is in contrast to enclosed or circular sections of many current designs which must bend in two areas and displace air in order to deflect.

It is still a further object of the present invention to provide a weatherstrip which is economical to produce.

It is still a further object of the present invention to provide a single weatherstrip which can be used all around the door and window opening for a hardtop window system.

The above and other objects of the present invention may be achieved by a weatherstrip for a motor vehicle for sealing windows which are substantially flush with an edge of the roof, pillars, and/or other surrounding portions of the vehicle or the door frame, comprising a main body portion attachable to a portion of the vehicle (either the door frame, roof, or roof and pillar structure) of the vehicle and a flexible gutter forming lip portion attached to the main body portion whereby when the weatherstrip is attached to the vehicle and either the window or the door of the hardtop-type window or the window of the framed door window is open, the gutter forming lip is positioned so that substantially all the water dripping off the portion of the surrounding roof, pillars, or door frame to which the weatherstrip is attached is prevented from entering the interior of the vehicle.

The above objects are also accomplished by a door glass weatherstripping for a motor vehicle for sealing windows which are substantially flush with an edge of the roof of the vehicle or other surrounding portions of the vehicle, comprising a main body portion attachable to a portion of the roof, pillars and other adjacent structure of the vehicle and a window positioning portion attached to the main body portion and having a hardness greater than at least the main body portion, with the window positioning portion being adapted to guide the window and perhaps even deflect it in its uppermost position thereby assuring lateral location of the window.

BRIEF DESCRIPTION OF THE DRAWINGS

The invention will now be described further, by way of example, with reference to the accompanying drawings. in which:

FIG. 1 is a perspective view of an automobile embodying the weatherstripping according to the present invention.

FIG. 2 is a side sectional view of the weatherstripping taken along line 2—2 of FIG. 1 according to the present invention.

FIG. 3 is a side sectional view of an alternative embodiment of the weatherstripping shown in FIG. 2 according to the present invention.

FIG. 4 is a perspective view of an automobile body showing a door aperture with the weatherstripping installed around the entire door aperture prior to installation of the door that contains a hardtop window system.

FIG. 5 is a cross sectional view taken along line 5—5 of FIG. 4 to which is added a cross-sectional view of the door and showing the weatherstripping located between the door and the "B" pillar according to the present invention.

FIG. 6 is a cross sectional view taken along line 6—6 of FIG. 4 to which is added a cross sectional view of the door and showing the weatherstripping located between the door and the rocker panel according to the present invention.

DESCRIPTION OF THE PREFERRED EMBODIMENTS

FIG. 1 is a perspective view of an automotive vehicle 10 incorporating the weatherstrip 20 of the present invention with a substantially perfectly flush hardtop-type window. The vehicle 10 includes a hardtop-type window 12 mounted in a door 14 which substantially abuts with and is adjacent to a roof portion 16 of the vehicle 10. The door 14 is mounted via a hinge in a side of the vehicle 10. The window 12 is retractably disposed in the door 14 from an uppermost position to a lowermost position. The weatherstrip 20 is disposed between the window 12 and an edge of the vehicle 10.

FIG. 2 illustrates a cross section of a weatherstrip 20 according to the present invention. The weatherstrip 20 is attached to the roof portion 16 of the vehicle 10 by a pinch weld flange 18 as is well known to those skilled in the art. The weatherstrip 20 includes a main body portion 22 that may include a hollow region 24 or may be completely solid as discussed below in connection with FIGS. 5 and 6. When the weatherstrip is used in a framed door, the weatherstrip is mounted on a pinch weld through the recessed portion shown as surrounding the pinch weld flange 18 in FIG. 2 where the door outer and the door inner are joined.

The weatherstrip 20 also includes a gutter forming lip portion 26 that has a flexible tip 28 which extends beyond the edge of the roof portion 16 and preferably extends beyond a plane 100, that is along the door glass or window 12 when the door 14 is in the closed position, and at least one of the window 12 and the door 14 is open. Thus if either the window 12 or the door 14 or both are open, the gutter forming lip portion 26, which is attached to the main body portion, will extend outwardly and become positioned so that substantially all the water dripping off the roof portion 16 will be prevented from entering the interior of the vehicle 10.

The weatherstrip 20 additionally includes a window positioning portion 30. The window positioning portion 30 is attached to the main body portion 22 and it has a hardness greater than at least the main body portion 22 of the weatherstrip 20 sufficient for deflecting the window 12. The window positioning portion 30 guides and/or deflects the window 12 into its uppermost position as shown in FIGS. 1 and 2 and assures proper lateral location of the window 12 for sealing, aerodynamic, and flush appearance purposes.

In the uppermost position, the window 12 contacts a gap-filling seal portion 32 of the weatherstrip 20. The gap-filling seal portion 32 is attached to the main body portion 22 and is positioned such that it fills the space between the edge of the roof portion 16 and the upper edge of the window 12. This seal portion 32 reduces and possibly prevents air, water, and other liquids from entering the interior of the vehicle 10 and contributes to smooth air flow over the surfaces. The window positioning portion 30 has a hardness greater than that of the gap-filling seal portion 32.

The weatherstrip 20 may optionally further include a trim cover lip portion 34 for covering an interior trim 36 (both of which are shown in phantom). The interior trim 36 is disposed along the roof or pillars as is well known in the art.

FIG. 3 illustrates another embodiment of the weatherstrip designated with reference numeral 120. Weatherstrip 120 includes a main body portion 122 which is attached to roof portion 16 of the vehicle 10 by a suitable adhesive 150. (It is noted that the weatherstrips disclosed in this application may also be attached to the door outer panel for framed door windows. Throughout the specification it is to be understood that where roof portion is mentioned, one skilled in the art would realize that for framed door windows the door outer panel could be substituted therefor.) The majority of the weatherstrip is attached to the section of the roof portion 16 which bends toward the interior of the vehicle 10. To locate the exact lateral position of the weatherstrip 120, the gap-filling seal portion 132 is provided with a locating lip 138 that is designed so that it has the contour of the roof portion 16. Thus, when the weatherstrip 120 is placed against the roof portion 16 and it is affixed thereto, the locating lip 138 acts to locate the weatherstrip 120 just a the pinch weld flange 18 acts to locate weatherstrip 20 in FIG. 2. The adhesive compound 150 may be selected from any of those adhesives well known in the art.

The weatherstrip 120 may also include a gutter forming lip portion 126 with a tip 128 and a window positioning portion 130. Likewise, the weatherstrip 120 may include one or more hollow regions 124 in the main body portion 122 and the gap filling seal portion 132 or they may be solid.

FIG. 4 discloses a portion of an automobile body 200 showing the weatherstripping 220 installed around the entire door aperture 210 for a hardtop-type window system prior to installation of the door. This attachment includes the weatherstripping 220 following along regions such as the roof portion 216, the "B" pillar 252 (or "C" pillar for rear doors) and the rocker panel 254. One embodiment of the present invention allows the weatherstrip 220 to be one continuous piece which starts and ends at mitered corner 240. Other embodiments contemplate the weatherstrip 220 being a plurality of individual pieces that are connected together around the door aperture 210. Molded weatherstrip pieces mounted to the door as are well-known in the art are contemplated to provide a continuous surface on the door to which the body-mounted weatherstrip seals.

As seen schematically in FIG. 4, the weatherstrip 220 includes a gap filling seal portion 232, a window positioning portion 230, and a gutter forming lip portion 226. These portion are shown in greater detail with respect to FIGS. 5 and 6.

FIG. 5 discloses the interaction of a section of a door 260, the "B" pillar 252, and the weatherstrip 220. The weatherstrip 220 includes a main body portion 222 attached to a pinch weld flange 218 of the B pillar 252. Attached to the main body portion 222 are the gutter forming lip portion 226, the window positioning portion 230 and the gap filling seal portion 232. The weatherstrip 220 may also include a trim cover lip portion 234 for covering an interior trim 236. As described above, the "C" pillar can be substituted for the "B" pillar in the case where there is a rear door on the vehicle.

In both FIGS. 5 and 6, the main body portion 222 is shown as being solid and does not have the hollow region as shown in FIGS. 2 and 3, although it is contemplated that hollows can be included.

FIG. 6 discloses the interaction between the door 260, the rocker panel 254 and the weatherstrip 220. The main body portion of the weatherstrip 222 is attached to the pinch weld flange 258 of the rocker panel 254. The trim cover lip portion 234 is disposed above a carpet trim cover panel 262 and this hides the edge of the carpet 264.

While FIGS. 5 and 6 disclose that the weatherstrip may be attached to the respective pinch weld flanges of the rocker panel and the respective pillars, it is to be understood that the weatherstrip may also be attached by adhesive in a manner similar to that shown in FIG. 3.

Since the weatherstrip may be used completely around the door aperture, there is no need for using separate types of weatherstrips for different portions around the door aperture. This means that production costs associated with design, development, and manufacturing can be reduced. New weatherstrip production methods may also allow the unused portions of the weatherstrip (i.e. the window positioning portion and the gap filling seal portion) to be inexpensively eliminated for the areas where the seal is not to a window.

The weatherstrip according to the present invention can be made of a rubber or an elastomeric material and this can be formed by multi-durometer extruding or, depending on the geometry of the parts, by a single durometer.

The present invention has been described with reference to certain preferred embodiments and those skilled in the art, in view of the present disclosure, will appreciate that numerous alternative embodiments of the invention are within the scope of the following claims.

What is claimed is:

1. A door glass weatherstripping for a motor vehicle, said weatherstripping comprising:
   a main body portion made of a certain material attachable to a portion of the vehicle; and
   a window positioning portion attached to said main body portion, said window positioning portion being made of the same material as said main body portion and having a hardness greater than that of at least said main body portion, said window positioning portion being positioned to guide a window in an uppermost position thereof thereby assuring lateral location of the window.

2. A door glass weatherstripping for a motor vehicle as defined in claim 1, wherein said window positioning portion hardness is sufficient for deflecting the window into the uppermost position.

3. A door glass weatherstripping as defined in claim 1, wherein said main body portion includes a recessed portion formed therein for attaching said main body portion to the vehicle.

4. A motor vehicle having a body portion with a door opening in each side thereof, a roof having a portion adjacent said door opening, a door hinged to said body in said opening with said door having a window retractably disposed in said door and said window being retractable from an uppermost position to a lowermost position, and a weatherstripping disposed between said window and an edge of said vehicle, said weatherstripping comprising:
   a main body portion made of a certain material fixedly attached to a portion of said vehicle; and
   a window positioning portion attached to said main body portion, said window positioning portion being made of the same material as said main body portion and having a hardness greater than that of at least said main body portion, said window positioning portion being positioned to guide said window into said uppermost position thereby assuring lateral location of said window.

5. A motor vehicle as defined in claim 4, wherein said main body portion is fixedly attached to said portion of said vehicle by adhesive.

6. A door glass weatherstripping for a motor vehicle, said weatherstripping comprising:
- a main body portion attachable made of a certain material to a portion of the vehicle;
- a gap-filling seal portion attached to said main body portion for filling a space between an edge of the vehicle and an upper edge of a window;
- a window positioning portion attached to said main body portion, disposed adjacent said gap-filling seal portion, said window positioning portion being made of the same material as said main body portion and having a hardness greater than that of at least said gap-filling seal portion, said window positioning portion being positioned to guide the window in an uppermost position thereof thereby assuring lateral location of the window; and
- a gutter forming lip portion attached to said main body portion, said gutter forming lip portion being flexible whereby when said weatherstrip is attached to the vehicle and at least one of the window and a door is open, said gutter forming lip portion is positioned so that substantially all of the water dripping off the vehicle where said weatherstrip is attached is prevented from entering an interior of the vehicle.

7. A motor vehicle having a body portion with a door opening in a side thereof, a roof having a portion adjacent said door opening, a door hinged to said body in said opening with said door having a window including inner and outer planar surfaces, said window being retractably disposed in said door and said window being retractable from an uppermost position to a lowermost position, and a weatherstripping disposed between said window and an edge of said vehicle, said weatherstripping comprising:
- a main body portion fixedly attached to said vehicle;
- a gap-filling seal portion attached to said main body portion for filling a space between said edge of said vehicle and an upper edge of said window when said window is in said uppermost position;
- a window positioning portion attached to said main body portion, disposed adjacent said gap-filling seal portion and having a hardness greater than that of at least said gap-filling seal portion, said window positioning portion being positioned to engage said window inner surface and to guide said window into said uppermost position thereby assuring lateral location of said window; and
- a gutter forming lip portion attached to said main body portion, said gutter forming lip portion being flexible whereby when at least one of said window and said door is open, said gutter forming lip portion is positioned so that substantially all of the water dripping off said vehicle where said weatherstrip is attached is prevented from entering an interior of said vehicle.

8. A motor vehicle as defined in claim 7, wherein said main body portion is fixedly attached to said portion of said vehicle by adhesive.

* * * * *